(12) United States Patent
Hong et al.

(10) Patent No.: US 8,665,400 B2
(45) Date of Patent: Mar. 4, 2014

(54) DISPLAY DEVICE

(75) Inventors: Sung-Hwan Hong, Suwon-si (KR);
Sung-Kyu Hong, Seongnam-si (KR);
Nam-Seok Lee, Suwon-si (KR);
Kwang-Hyun Kim, Guri-si (KR);
Min-Jae Kim, Suwon-si (KR);
Kyong-Ok Park, Bucheon-si (KR)

(73) Assignee: Samsung Display Co., Ltd. (KR)

( * ) Notice: Subject to any disclaimer, the term of this patent is extended or adjusted under 35 U.S.C. 154(b) by 1188 days.

(21) Appl. No.: 11/954,117

(22) Filed: Dec. 11, 2007

(65) Prior Publication Data

US 2008/0225208 A1 Sep. 18, 2008

(30) Foreign Application Priority Data

Dec. 22, 2006 (KR) .................. 10-2006-0132455

(51) Int. Cl.
*G02F 1/1335* (2006.01)
(52) U.S. Cl.
USPC ............................................ 349/96; 349/101
(58) Field of Classification Search
USPC .................................................. 349/96–103
See application file for complete search history.

(56) References Cited

U.S. PATENT DOCUMENTS 4,610,508 A * 9/1986 Nakanowatari ................. 349/97
6,122,026 A * 9/2000 Takatani et al. ............... 349/112

FOREIGN PATENT DOCUMENTS

| JP | 01-238621 | 9/1989 |
| JP | 04-256923 | 9/1992 |
| JP | 04-319914 | 11/1992 |
| JP | 06-281927 | 10/1994 |
| JP | 08-184844 | 7/1996 |
| JP | 2004-198725 A | 7/2004 |
| JP | 2006-235578 A | 9/2006 |
| JP | 2006-285220 A | 10/2006 |
| KR | 10-2007-0092856 A | 9/2007 |
| KR | 10-2008-0027421 A | 3/2008 |
| KR | 10-2008-0064525 A | 7/2008 |

* cited by examiner

*Primary Examiner* — Dung Nguyen
(74) *Attorney, Agent, or Firm* — Innovation Counsel LLP

(57) ABSTRACT

A pair of polarizers having different polarization efficiencies is employed for a display device. With such a pair of polarizers, the brightness may increase without deteriorating the contrast.

10 Claims, 5 Drawing Sheets

DISPLAY DEVICE

CROSS-REFERENCE TO RELATED APPLICATIONS

This application claims priority to and the benefit of Korean Patent Application No. 10-2006-0132455, filed before the Korean Intellectual Property Office on Dec. 22, 2006, which is incorporated herein by reference in its entirety.

BACKGROUND OF THE INVENTION (a) Technical Field

The present invention relates to display device technology and, more particularly, to the application of a pair of polarizers to a display device.

(b) Discussion of the Related Art

In general, a liquid crystal display (LCD) device displaying an image by controlling the polarization state of the incident light includes a pair of polarizers and a display panel. The first polarizer provides a first polarized light to the display panel, and the display panel changes the polarization state of the first polarized light by utilizing, for example, the eletro-optical characteristics of liquid crystal molecules therein. The second polarizer transmits only a parallel component of the light to its transmission axis. Brightness and contrast ratio are one of the key optical measures for display quality of a display device. However, since contrast ratio is defined by a ratio of the maximum transmittance to the minimum transmittance, there is a trade-off between brightness and contrast ratio in conventional LCD devices. Therefore, there is demanded to provide a new LCD device that improves brightness without sacrificing the contrast ratio.

SUMMARY

Devices disclosed herein are applicable to display devices. For example, in accordance with an embodiment of the present invention, a display device includes two polarizers, a pair of panels disposed therebetween and a backlight. The two polarizers are chosen to have different degrees of polarization so that the polarizer of lower polarization efficiency may transmit a light whose polarization direction is slightly deviated from the transmission axis of the polarizer, thereby enhancing the brightness without deteriorating the contrast ratio.

One of the embodiments according to the present invention includes a backlight assembly; a first polarizer having a first polarization efficiency and a first axis of transmission; a second polarizer having a second polarization efficiency higher than the first polarization efficiency and a second axis of transmission, the second polarizer disposed opposite the backlight assembly with respect to the first polarizer, and a twisted nematic liquid crystal layer disposed between the first polarizer and the second polarizer.

The scope of the invention is defined by the claims. A more complete description of the embodiments of the present invention and their advantages are provided in the following text.

DETAILED DESCRIPTION OF EXEMPLARY EMBODIMENTS

Figure 1:
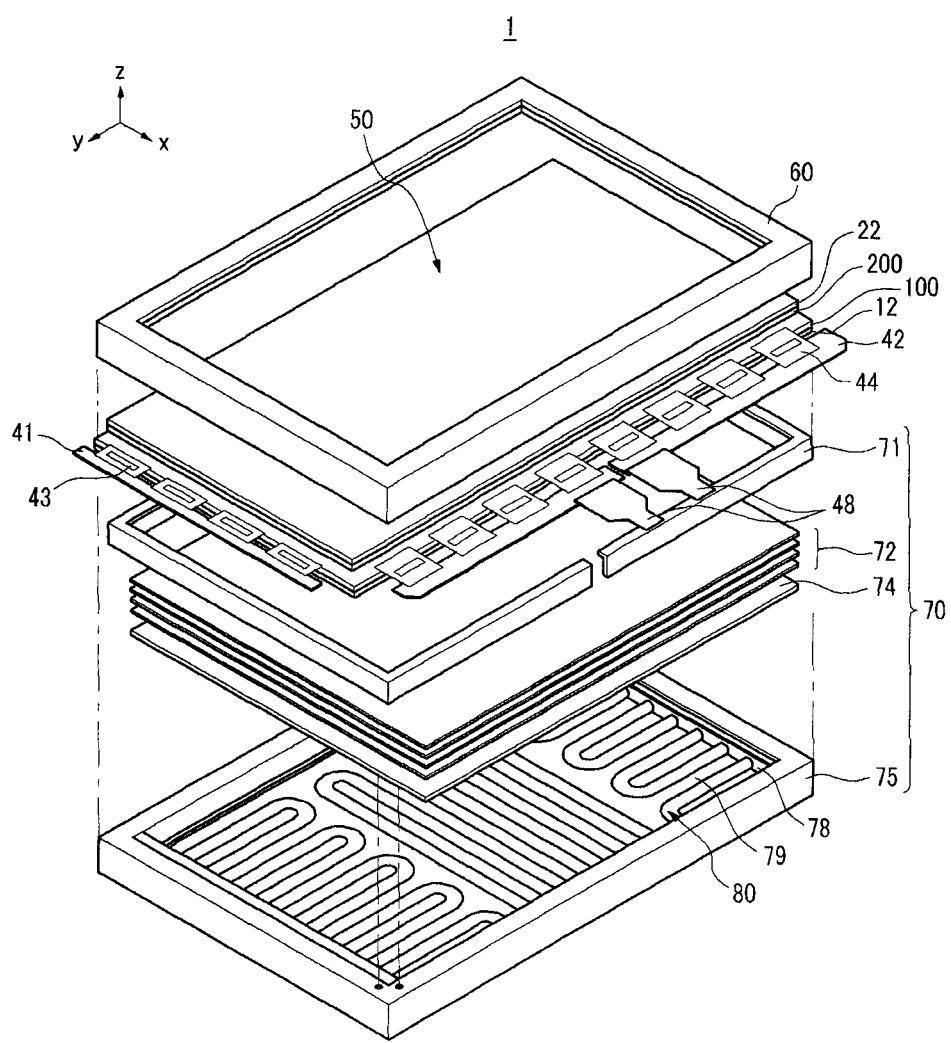
FIG. 1 is an exploded diagram of an exemplary display device in accordance with an embodiment of the present invention.

Like reference numerals are used to identify like elements in the figures. Furthermore, the elements or layers may not be drawn to scale and may be magnified for clarity (e.g., when illustrating semiconductor layers). Also, the words "above" or "on" may be used, for example, to refer to a position of a layer, an area, or a plate relative to another referenced element, but such use is not intended to exclude an intermediate element disposed between the referenced element and the layer, area, or plate. However, the terms "directly above" or "directly on" are used to indicate that no intermediate element exists between the referenced element and the layer, area, or plate.

Display Device

FIG. 1 is an exploded diagram of an exemplary display device 1 in accordance with an embodiment of the present invention. As shown in FIG. 1, the display device 1 comprises a display panel assembly 50, a backlight assembly 70 and a chassis 60.

The backlight assembly 70 provides the display panel assembly 50 with planarized light. The display panel assembly 50 displays an image by controlling the light transmittance according to the image information.

The chassis 60 secures the display panel assembly 50 to the back light assembly 70.

Backlight Assembly

Referring to FIG. 1, the backlight assembly 70 includes a container 75, a reflector 79, a backlight 80, a backlight holder 78, one or more optical sheets 72, a diffuser 74, and a frame 71.

The reflector 79 is disposed on the bottom of the container 75 and reflects a light from the backlight 80 toward the display panel assembly 50.

The backlight 80 is a light source for the display device 1. It may comprise a cold cathode fluorescent lamp (CCFL) or a hot cathode fluorescent lamp (HCFL) or a light-emitting diode (LED). The lamps shown in FIG. 1 are U-shaped lamps arranged on the surface of the reflector 79. However, they may be linear lamps and they may be arranged on an edge of a light guide panel on the reflector 79.

The optical sheets 72 (e.g. one or two prism sheets, a reflective polarizer for recycling light, etc.) and the diffuser 74 are intended to enhance the brightness and/or the light uniformity over the display panel assembly 50. The stacking order of each optical sheet 72 and the diffuser 74 may vary according to the overall optical characteristics.

The frame 71 fixes the optical sheets 72 and the diffuser 74 to the container 75.

Display Panel Assembly

Referring to FIG. 1, the display panel assembly 50 includes a first polarizer 12, a first panel 100, a liquid crystal layer (not shown), a second panel 200 and a second polarizer 22. The display panel assembly 50 further includes a gate driver 43 and a data driver 44, respectively providing a gate signal and a data signal to the first panel 100.

The gate driver 43 and the data driver 44 are attached on the sides of the first panel 100 in the form of a chip as shown in FIG. 1. However, the gate driver 43 and/or the data driver 44 may be formed directly on the first panel 100 in the form of circuitry. The display panel assembly 50 may further include a birefringent layer (not shown) between the first polarizer 12 and the first panel 100, or the second polarizer 22 and the second panel 200, to compensate the birefringence of the liquid crystal layer.

The present invention will be described hereinafter with an embodiment where the first panel 100 includes a thin film transistor and a pixel electrode and the second panel 200 includes a color filter and a reference electrode, but the present invention may also be applied to display devices having different structures.

First Panel

Figure 2:
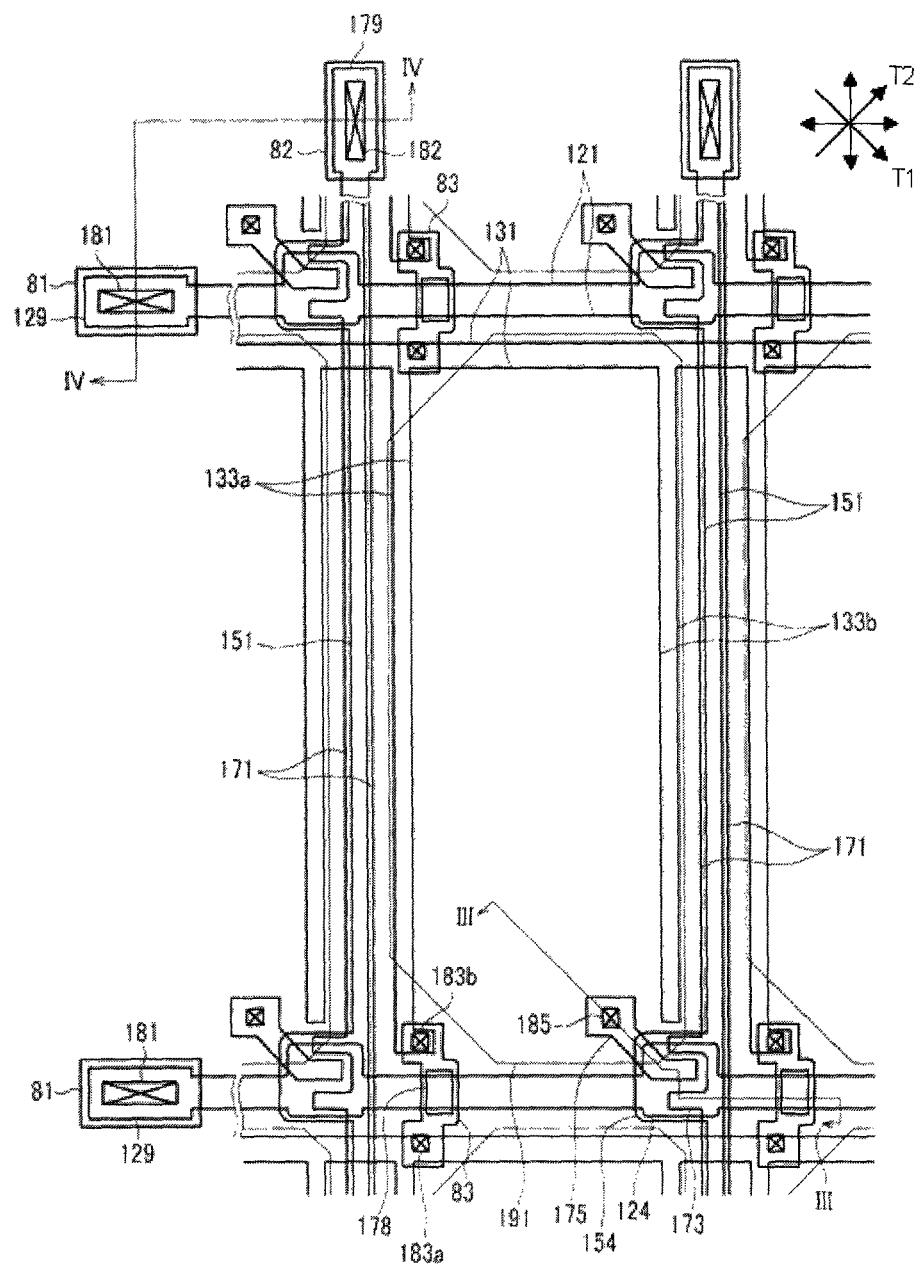
FIG. 2 is a layout view of an exemplary first panel in accordance with an embodiment of the present invention.
Figure 3:
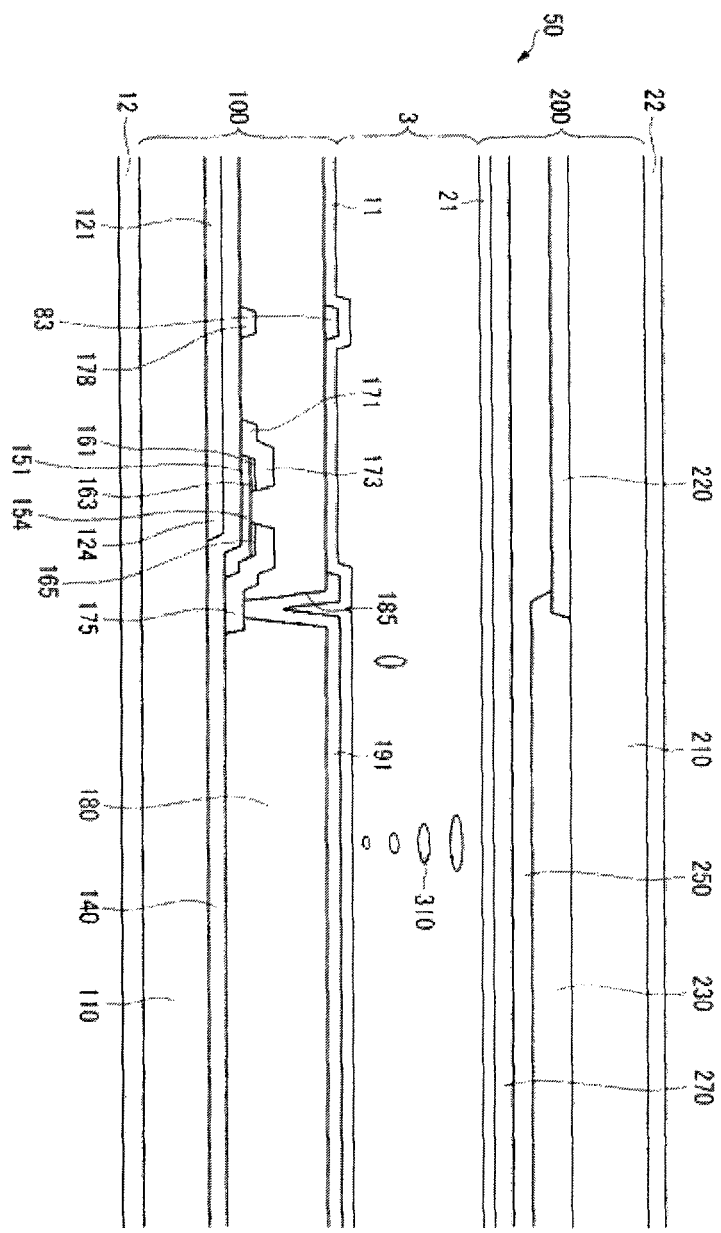
FIG. 3 is a cross-sectional view of the display panel assembly, taken along the line III-III of FIG. 2.
Figure 4:
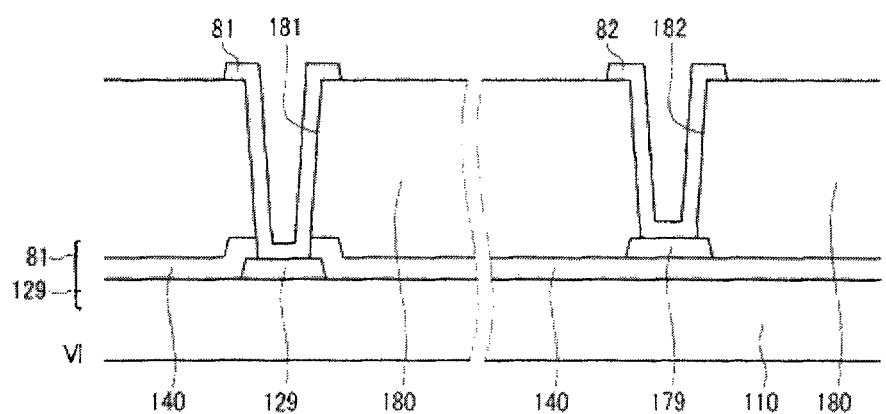
FIG. 4 is a cross-sectional view of the display panel assembly, taken along the line IV-IV of FIG. 2.

FIG. 2 is a layout view of an exemplary first panel in accordance with an embodiment of the present invention and FIGS. 3 and 4 are cross-sectional views of the display panel assembly, respectively, taken along the lines III-III and IV-IV of FIG. 2.

Referring to FIGS. 2 to 4, the first panel 100 includes a first substrate 110, a gate line 121, a storage line 131, a gate insulating layer 140, a semiconductor active layer 154, an ohmic contact layer 163 and 165, a data line 171, a passivation layer 180, a pixel electrode 191, and an first alignment layer 11.

The first substrate 110 supports structures to be formed on the first substrate 110. The first substrate 110 is transparent and insulative, and may be made of glass, plastic, etc.

The gate line 121 for transmitting a gate signal is formed on the first substrate 110 and includes a gate electrode 124 and a gate pad 129 for an electrical connection to the gate driver 43.

The storage line 131 includes a set of branches 133*a* to 133*d* and a connection 133*e*. With the pixel electrode 191, the storage line 131 and the branches 133*a* and 133*b* form a storage capacitor $C_{ST}$ to increase the voltage holding ratio (VHR) of a liquid crystal capacitor $C_{LC}$ to be described later.

The gate line 121 and the storage line 131 may be made of a low resistance material such as aluminum, silver, copper, molybdenum, chromium, titanium, tantalum or their alloys. The gate line 121 and/or the storage line 131 may have a multilayer structure. The gate line 121 and/or the storage line 131 may have a tapered structure, preferably, with a taper angle from 30 degrees to 80 degrees.

The gate insulating layer 140 is formed on the gate line 121 and the storage line 131. The gate insulating layer 140 may be made of silicon nitride (SiNx) or silicon oxide (SiOx). The gate insulating layer 140 may have a multilayer structure.

The semiconductor active layer 154 is formed on the gate insulating layer 140 over the gate electrode 124. A semiconductor strip 151 is formed on the gate insulating layer 140 under the data line 171 for simplifying the manufacturing process, as shown in FIG. 2, but the semiconductor strip 151 may be omitted. The semiconductor active layer 154 and the semiconductor strip 151 may be made of hydrogenated amorphous silicon (a-Si:H) or poly-silicon.

The ohmic contact layer 163 and 165 is formed on the semiconductor active layer 154. An ohmic contact strip 161 is formed on the semiconductor strip 151 for simplifying the manufacturing process, as shown in FIG. 2, but the ohmic contact strip 161 may be omitted especially when the semiconductor strip 151 is omitted. The ohmic contact layer 163 and 165 and the ohmic contact strip 161 are made of hydrogenated amorphous silicon doped with n-type dopant (n+a-Si:H) or silicide.

The semiconductor strip 151 and/or the ohmic contact strip 161 may have a tapered structure, preferably, with a taper angle from 30 degrees to 80 degrees.

The data line 171, a drain electrode 175 and a metal piece 178 are formed on the ohmic contact strip 161, the ohmic contact layer 165 and the gate insulating layer 140, respectively. The data line 171 for transmitting a data signal intersects the gate line 121, the storage line 131 and the connection 133*e*. The data line 171 includes a source electrode 173 on the ohmic contact layer 163, and a data pad 179 for an electrical connection to a data driver 44.

The drain electrode 175 is separated from the data line 171. One end of the drain electrode 175 is enclosed with the source electrode 173, and the other end is for the electrical connection to the pixel electrode 171.

The gate electrode 124, the source electrode 173 and the drain electrode 175 form a thin film transistor (TFT) having a channel between the source electrode 173 and the drain electrode 175.

The metal piece 178 is formed over the gate line 121 to enhance step coverage of the overlying structure, but may be omitted.

The data line 171, the drain electrode 175 and the isolated metal piece 178 are also made of a low resistance material, and may have a multilayer structure and/or a tapered structure, preferably, with a taper angle from 30 degrees to 80 degrees.

The passivation layer 180 is formed on the channel, the data line 171, the drain electrode 175 and the metal piece 178. The passivation layer 180 is made of inorganic or organic insulating material, and may have a flat surface. The inorganic insulating material may be silicon nitride (SiNx) or silicon oxide (SiOx). The organic insulating material may be photosensitive, preferably with a dielectric constant less than 4.0. The passivation layer 180 may have a multilayer structure, for example, an organic upper layer on an inorganic lower layer, to achieve better insulating and passivating characteristics.

The pixel electrode 181, a bridge 83 and contact assistants 81 and 82 made of indium tin oxide (ITO) or indium zinc oxide (IZO) are formed on the passivation layer 180.

The pixel electrode 191 is electrically connected to the drain electrode 175 via a contact hole 185. When a data voltage is applied to the pixel electrode 191 and a reference voltage to the reference electrode 270, an electric field is generated in the liquid crystal layer 3 between the pixel electrode 191 and the reference electrode 270. The liquid crystal molecules in the liquid crystal layer 3 changes their orientations and accordingly changes the polarization state of the light passing the liquid crystal layer 3. The pixel electrode 191 and the reference electrode 270 with the liquid crystal layer 3 disposed therebetween form a liquid crystal capacitor $C_{LC}$ for keeping the voltage difference between the pixel electrode 270 and the reference electrode 270 when the TFT goes off.

The pixel electrode 191 may have a chamfered rectangular shape as shown in FIG. 2. The chamfers of the pixel electrode 191 at four corners make an angle of 45 degrees with the gate line 121.

The bridge 83 crosses the gate line 121 over the metal piece 178, and connects the storage line 131 with the branch 133*a* via bridge holes 183*a* and 183*b*. The storage line 131, the branches 133*a* and 133*b* may be utilized in repairing defects in the data line 171 or the thin film transistor with the help of the bridge 83.

The first alignment layer 11 is formed on the pixel electrode 191. The first alignment layer 11 is for the initial alignment of the liquid crystal molecules near the pixel electrode 191. The first alignment layer 11 may align the liquid crystal molecules near the pixel electrode 191 vertically with respect to the pixel electrode 191.

Second Panel

Referring to FIG. 3, the second panel 200 includes a second substrate 210, a light blocking layer 220, a color filter 230, an overcoat 250, a reference electrode 270, and a second alignment layer 21.

The second substrate 210 supports structures to be formed on the second substrate 210. The second substrate 210 is transparent and insulative, and may be made of glass, plastic, etc.

The light blocking layer 220 is formed on the second substrate 210 and blocks a light leakage between two adjacent pixel electrodes 191. The light blocking layer 220 has an opening opposite the pixel electrode 191, whose shape is similar to the pixel electrode 191. The light blocking layer 220 may be made of a metallic material such as chromium, chromium oxide, etc., or may comprise a black pigment such as carbon black. The light blocking layer 220 may have a multilayer structure such as chromium and chromium oxide to reduce the reflectance.

The color filter 230 is formed on the substrate 210 and within the opening of the light blocking layer 220. The color filter 230 may represent one of three primary colors such as red, green and blue.

The overcoat 250 is formed on the light blocking layer 220 and the color filter 230, and is made of an insulating material. The overcoat 250 protects the color filter 230 and provides a flat surface. The overcoat 250 may be omitted.

The reference electrode 270 is formed on the overcoat 250. The reference electrode 270 is made of ITO or IZO, but may be made of an opaque metal when formed on the same side as the pixel electrode 171.

The second alignment layer 21 is formed on the reference electrode 270. The second alignment layer 21 is for the initial alignment of the liquid crystal molecules near the reference electrode 270. The second alignment layer 21 may align the liquid crystal molecules near the reference electrode 270 vertically with respect to the reference electrode 270.

Liquid Crystal Layer

Referring to FIG. 3, the liquid crystal layer 3 is disposed between first panel 100 and the second panel 200. The liquid crystal molecules have a positive dielectric anisotropy and a positive optical anisotropy. When no voltage is applied to the liquid crystal layer 3, a twisted configuration of the liquid crystal molecules is formed between the first substrate 110 and the second substrate 210. The first substrate 110 and the second substrate 210 are coated with the first alignment layer 11 and the second alignment layer 21, respectively, to assure uniform alignment of the liquid crystal molecules with the directions of alignment on both substrates 110 and 210 rotated by 90 degrees.

When a non-zero voltage is applied to the liquid crystal layer 3, the liquid crystal molecules tend to orient themselves parallel to the electric field generated due to the positive dielectric anisotropy. The extent of the orientation, i.e. the polar angle, depends on the strength of the electric field. When a voltage sufficient to make the liquid crystal molecules orient almost perpendicular to the substrates 110 and 210, a normally incident light can pass through the liquid crystal layer 3 with its polarization state almost unchanged. With the two polarizers 12 and 22 arranged perpendicular, most of the incident light from the backlight assembly 70 will be blocked when a sufficient voltage is applied When no voltage is applied to the liquid crystal layer 3, the liquid crystal molecules can change a linearly polarized light into another linearly polarized light rotated by 90 degrees. Thus, on leaving the liquid crystal layer 3, the light can pass through the second polarizer 22. Inevitably, however, there is an unnecessary effect due to the alignment of the liquid crystal molecules. The alignment is usually made using rubbing technology by which each alignment layer 11 and 21 is mechanically rubbed along the transmission axis of the adjacent polarizer 12 and 22. Microscopically, however, the rubbing direction is not perfectly parallel to the transmission axis and the rubbing direction may slightly deviate from the transmission axis. Such a deviation in rubbing direction brings about a deviation in polarization change by the liquid crystal layer 3, and decreases the transmittance when no voltage is applied.

The thickness of the liquid crystal layer 3 may be determined to give the maximum transmittance when no voltage is applied to the liquid crystal molecules.

Polarizers

Referring to FIGS. 1 to 3, a first polarizer 12 and a second polarizer 22 are respectively disposed adjacent to the first panel 100 and the second panel 200.

Referring to FIG. 2, the transmission axes T1 and T2 of the two polarizers 12 and 22 are perpendicular to each other, and generally make an angle of 45 degrees with the gate line 121 or the data line 171. In general, each transmission axis is parallel to the adjacent alignment direction of the liquid crystal molecules.

The first polarizer 12 polarizes the light from the backlight assembly 70 and provides a linearly polarized light to the liquid crystal layer 3. The second polarizer 22 plays a role as an analyzer permitting only a parallel component of the light leaving the liquid crystal layer 3 to transmit.

Because any commercial polarizer is not ideal, the transmitted light is not a perfectly polarized light. The polarization efficiency of a polarizer may be defined by:

$$PP = \sqrt{\frac{T_{parallel} - T_{perpendicular}}{T_{parallel} + T_{perpendicular}}} \times 100(\%),$$

where $T_{parallel}$ is a transmittance of the two stacked polarizers whose transmission axes are parallel to each other, and $T_{perpendicular}$ is a transmittance of the two stacked polarizers whose transmission axes are perpendicular to each other. Here, $T_{parallel}$ and $T_{perpendicular}$ are dependent on the wavelength of the light, and thus so is the polarization efficiency.

According to one embodiment of the present invention, the polarization efficiency of the first polarizer 12 is lower that that of the second polarizer 22, whereby the brightness can be enhanced without deteriorating the contrast ratio. The polarization efficiency of the first polarizer 12 may be equal to or less than 99.9% with respect to a white light from a black body light source at about 6500K. The polarization efficiency of the second polarizer 22 may exceed 99.9% with respect to a white light from a black body light source at about 6500K.

Figure 5:
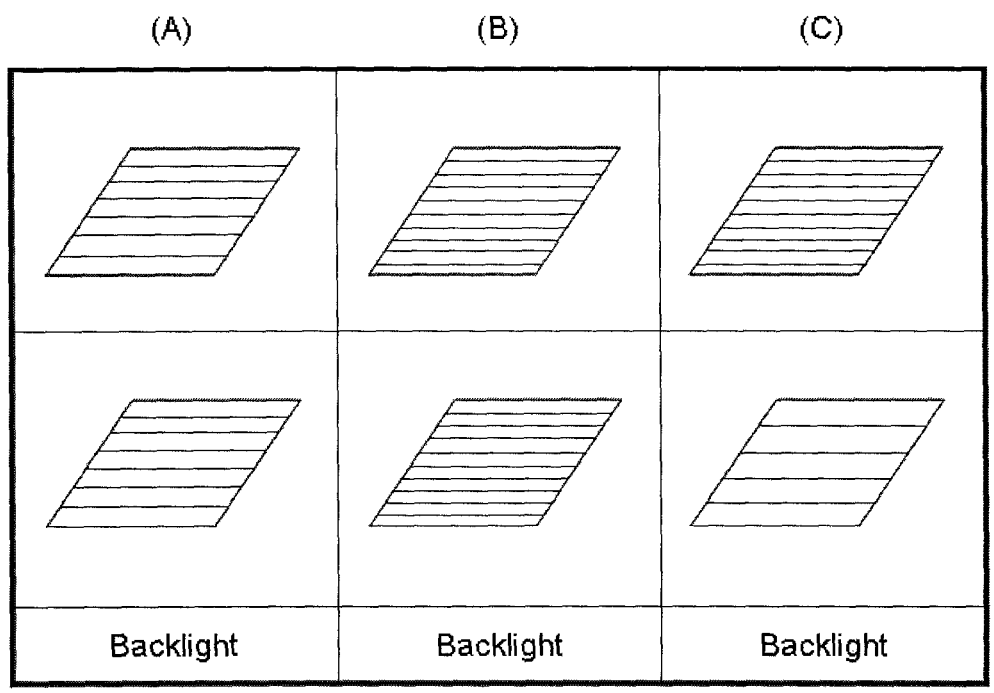
FIG. 5 is a schematic diagram illustrating three pairs of polarizers.

Now, the operation of a pair of polarizers having different polarization efficiencies will be described with reference to FIG. 5. FIG. 5 is a schematic diagram illustrating three pairs of polarizers.

Diagram (A) shows an example of two conventional polarizers having the same polarization efficiency $PE_{conv}$. Diagram (B) shows that the two polarizers have the same polarization efficiency $PE_{high}$ which is higher than $PE_{conv}$. Diagram (C) shows an example of when the second polarizer has a polarization efficiency $PE_{high}$ and the first polarizer has a polarization efficiency $PE_{low}$ which is lower than $PE_{conv}$.

In case (A), since the two polarizers have the same conventional polarization efficiency, the transmitted light includes a non-negligible amount of light whose polarization direction is slightly deviated from the transmission axis of the polarizer. Thus, the maximum transmittance increases. However, the minimum transmittance would not be negligible when the two polarizers are arranged perpendicular to each other, and thus the contrast ratio decreases.

In case (B), since the two polarizers have the same high polarization efficiency, the transmitted light would be an almost perfectly polarized light. Thus, the maximum transmittance decreases. However, the minimum transmittance would be negligible when the two polarizers are arranged perpendicular to each other, and thus the contrast ratio increases.

In case (C), let's consider the minimum transmittance first. Since the polarization efficiency of the first polarizer is low, the transmitted light may be a less perfectly polarized light and may have a component perpendicular to its transmission axis. However, the polarization state of this perpendicular component may slightly change while traveling the liquid crystal layer because the liquid crystal molecules near the substrates never go perfectly perpendicular, and thus the perpendicular component would be blocked by the second polarizer of a higher polarization efficiency. Therefore, the minimum transmittance is as negligible as in case (B).

Next, let's consider the maximum transmittance. The light transmitted from the first polarizer may have a component other than that parallel to the transmission axis. Then, the polarization state of this component may be changed into the linear polarization parallel to the transmission axis of the second polarizer because of the deviation of the microscopic rubbing direction. Therefore, the maximum transmittance increases.

The following Table 1 is a set of data from three experiments (A), (B) and (C). Experiment (A) is performed with a pair of conventional polarizers whose polarization efficiency is about 99.9% with respect to a white light from a black body light source at about 6500K. Experiment (B) is performed with a pair of polarizers of high polarization efficiency, and experiment (C) with a first polarizer of low polarization efficiency and a second polarizer of high polarization efficiency, where the high polarization efficiency is about 99.97%-99.99% and the low polarization efficiency is about 98.99%-99.15% with respect to a white light from a black body light source at about 6500K.

TABLE 1

|  | (A) 2nd pol:$PE_{conv}$ 1st pol:$PE_{conv}$ | (B) 2nd pol:$PE_{high}$ 1st pol:$PE_{high}$ | (C) 2nd pol:$PE_{high}$ 1st pol:$PE_{low}$ | Remark |
|---|---|---|---|---|
| Maximum Transmittance | 294 | 282 | 289 | A > C >> B (Good-Bad) |
| Minimum Transmittance | 0.36 | 0.33 | 0.34 | A >> C > B (Bad-Good) |
| Contrast Ratio | 816 | 854 | 850 | B > C >> A (Good-Bad) |

From Table 1, it is clear that experiment (C) according to the present invention shows good results in every respect. Therefore, a display device having good characteristics in brightness and contrast can be provided with a pair of polarizers having different polarization efficiency.

Embodiments described above illustrate but do not limit the invention. Numerous modifications and variations are possible within the scope of the present invention.

What is claimed is:

1. A display device comprising:
a backlight assembly;
a first polarizer disposed above the backlight assembly to receive light from the backlight assembly, the first polarizer having a first polarization efficiency and a first axis of transmission;
a second polarizer disposed above the first polarizer so as to receive light passed through at least the first polarizer, the second polarizer having a second polarization efficiency higher than the first polarization efficiency and a second axis of transmission different from that of the first polarizer, wherein the second polarization efficiency is 99.97% or higher, and
a twisted nematic liquid crystal layer disposed between the first polarizer and the second polarizer.

2. The display device of claim 1, wherein the first axis of transmission is substantially perpendicular to the second axis of transmission.

3. The display device of claim 2, wherein the first polarization efficiency is in the range of about 98.99% to 99.15% with respect to a white light from a black body light source at about 6500K.

4. The display device of claim 2, wherein the second polarization efficiency is in the range of about 99.97% to 99.99% with respect to a white light from a black body light source at about 6500K.

5. The display device of claim 1, wherein the backlight assembly comprises:
a light guide plate;
a light source disposed at the light guide plate, and
a diffuser disposed between the first polarizer and the light guide plate.

6. A display device comprising:
a backlight assembly configured for providing a light;
a first polarizer disposed above the backlight assembly to receive the provided light of the backlight assembly, the first polarizer having a first polarization efficiency and a first transmission axis;
a second polarizer disposed above the first polarizer so as to receive light passed through at least the first polarizer, the second polarizer having a second polarization efficiency and a second transmission axis, the second polarization efficiency being higher than 99.97%, the second polarization efficiency being higher than the first polarization efficiency, and the second transmission axis being substantially perpendicular to the first transmission axis;
a first substrate disposed between the first polarizer and the second polarizer;
a second substrate disposed between the first substrate and the second polarizer;

a liquid crystal layer disposed between the first substrate and the second substrate having a positive dielectric anisotropy.

7. The display device of claim 6, wherein the first polarization efficiency is in the range of about 98.99% to 99.15% with respect to a white light from a black body light source at about 6500K.

8. The display device of claim 6, wherein the second polarization efficiency is in the range of about 99.97% to 99.99% with respect to a white light from a black body light source at about 6500K.

9. The display device of claim 6, further comprising:
a gate line formed on the first substrate and having a gate electrode;
an gate insulating layer on the gate electrode;
a semiconductor formed on the gate insulating layer and overlapping the gate electrode;
a data line including a source electrode, the source electrode being formed at least in part on the semiconductor;
a drain electrode formed at least in part on the semiconductor and spaced apart from the source electrode;
a passivation layer covering a gap between the source electrode and the drain electrode;
a color filter on the passivation layer;
a pixel electrode formed on the color filter and electrically connected to the drain electrode, and
a reference electrode on the second substrate.

10. The display device of claim 9, further comprising:
an organic insulating layer between the color filter and the pixel electrode.

* * * * *